United States Patent [19]

Groleau

[11] Patent Number: 4,760,749
[45] Date of Patent: Aug. 2, 1988

[54] MOLD PRESSURE SENSOR BODY

[76] Inventor: Rodney J. Groleau, 1753 Apache Pass, Traverse City, Mich. 49684

[21] Appl. No.: 7,183

[22] Filed: Jan. 27, 1987

[51] Int. Cl.⁴ .......................... G01L 5/00; B29C 45/76
[52] U.S. Cl. ..................................... 73/866.5; 73/768; 73/862.54
[58] Field of Search ............. 73/862.54, 866.5, 862.38, 73/768, 855, 431; 425/149, 170

[56] References Cited

U.S. PATENT DOCUMENTS

| | | | |
|---|---|---|---|
| 3,807,914 | 4/1974 | Paulson et al. | 425/149 X |
| 4,427,075 | 1/1984 | Romes | 73/862.69 X |
| 4,495,810 | 1/1985 | Tessarzik et al. | 73/866.5 |
| 4,526,044 | 7/1985 | Moser et al. | 73/768 |
| 4,651,436 | 3/1987 | Gaal | 33/542 |

Primary Examiner—Charles A. Ruehl
Attorney, Agent, or Firm—James M. Deimen

[57] ABSTRACT

A generally oblong mold pressure sensor body containing electrical or mechanical sensing components there-within actuated by a sensing element or surface on the outside of the body, the sensing element or surface being adapted to engage a mold ejector pin. The sensor body is substantially rectangular in side view and generally peanut shaped in plan view with a relatively narrow waist between forward and rearward lobes. Extending from the forward lobe for engagement with the end of a sensor channel in the mold structure is a tongue of less thickness than the sensor body. The tongue may be removed to change the location of the sensing element relative to the end of the channel in the mold ejector plate. The double lobed sensor body shape provides the stability of a rectangular sensor body in a rectangular channel, however, the lobed body can be slid into and out of a curved blind channel as well as a straight blind channel without disassembly of the ejector plate from the mold. The radius of curvature of the channel need only be greater than the radius of curvature of the waist or neck between the lobes of the sensor body. An alternative embodiment comprises a multiple lobed snap-together chain that can be slid into and out of both straight and curved blind channels.

24 Claims, 3 Drawing Sheets

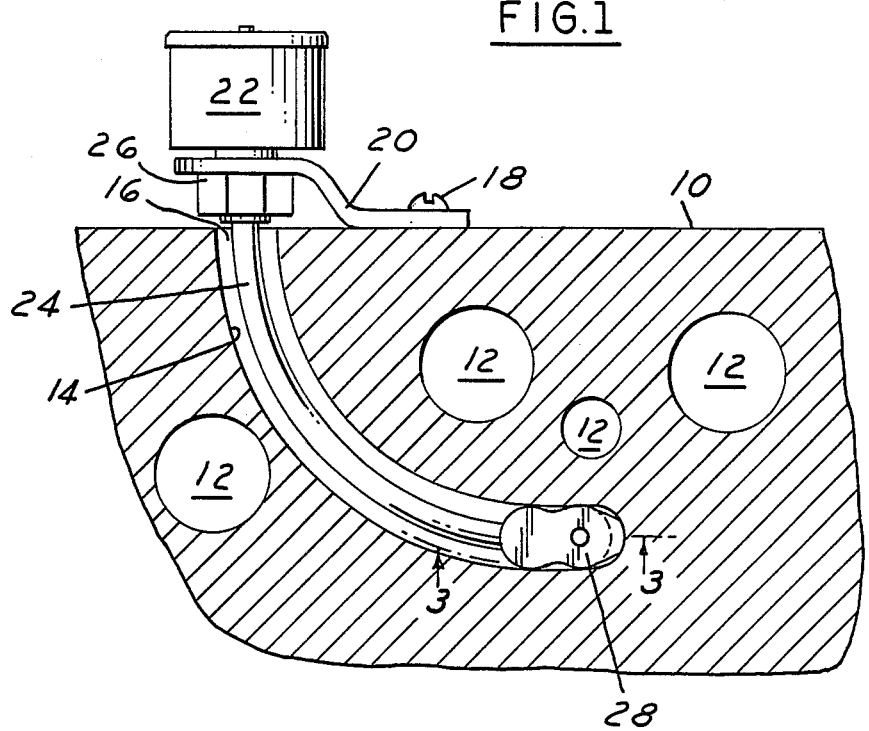
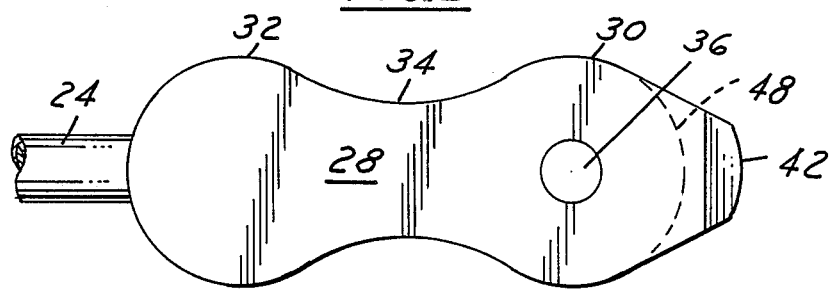
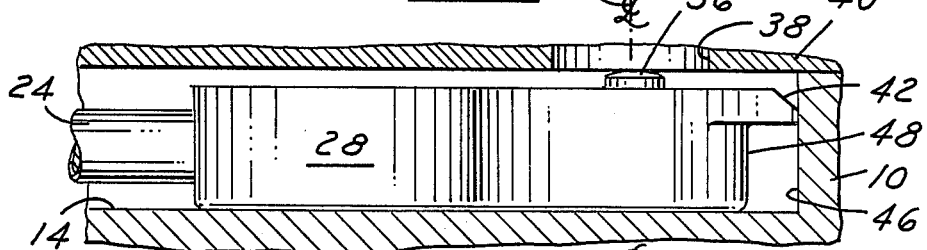
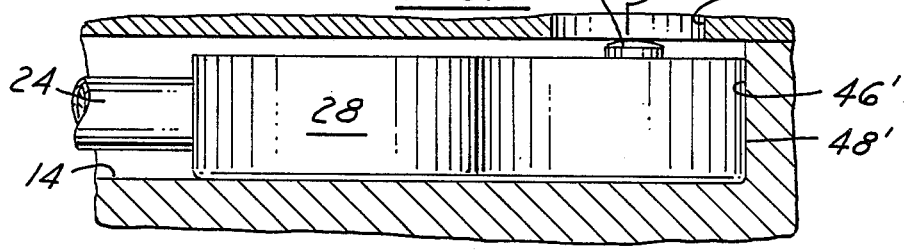

MOLD PRESSURE SENSOR BODY

BACKGROUND OF THE INVENTION

The field of the invention pertains to means for sensing the fluid pressure within a mold cavity and, in particular, to sensing the in-cavity fluid pressure exerted axially against the ejector pins or dummy pins of a plastic injection mold, compression mold, die cast mold or metal consolidation mold.

Available are load cells constructed of piezo-electric or electro-mechanical transducers sealed in steel bodies that are placed at the ends of the ejector pins remote from the mold cavity. The ejector pins rest on sensing elements atop or located in the top surface of the steel bodies.

A small cavity or oblong slot is milled into the mold ejector plate beneath the ejector pin for the placement of a sensor. Where the slot extends full width straight to the edge of the ejector plate, an oblong slide mold pressure sensor may be inserted and removed without disassembly of the mold and ejector plate. Where mold configuration does not permit a straight full width slot, a small channel for the electric wires to a button mold pressure sensor is provided. In the latter configuration, the mold and ejector plate must be disassembled to insert or remove the sensor.

Slide mold pressure sensors are exemplified by the D-M-E Standard SS-405C and SS-406C sensors supplied by D-M-E Company, Madison Heights, Mich. Of generally rectangular parallelepiped form these sensors require that the full width channel to the edge of the ejector plate be straight. Button mold pressure sensors are exemplified by D-M-E Standard BS-412C and BS-413C sensors. Of squat cylindrical form these sensors cannot be removed without disassembly of the ejector plate from the ejector retainer plate and are thus an integral part of the mold assembly.

Button sensors typically have exposed cables. The entrance of the cable, at the side of the button sensor is typically weak and subject to failure when relatively low forces are applied to the cable during installation or removal from the mold assembly. Cable failure at the connector end of the cable is also common due to forces applied to the cable during installation.

On both button and slide sensors, cable damage is the largest cause of sensor failure in the industry. Slide sensors generally have a Teflon or polyvinyl chloride coated cable enclosed in a flexible stainless steel armored jacket. The armored jacket protects the cable from abrasion but does not provide a stiff structural member for insertion or removal of the sensor from the slot or channel. The armored jacket also has relatively low transverse strength. Thus, the armored cable can be easily pinched and damaged. When such damage occurs, field repair is not possible because repair of the cable is difficult at best.

The cables above, whether or not armored, are not structurally rigid and the mold builder or assembler must provide positive means to hold the sensors in place. The friction spring on top of a commercially available slide sensor is normally not sufficient to properly retain the sensor in position in a production mold unless the sensor is installed from the top of a mold so that the force of gravity can provide additional holding force.

Button sensors are retained in place by the pockets for the sensors and therefore do not normally require restraining devices. However, many failures occur because the cables become displaced during assembly of the ejector and ejector retainer plates. The cables tend to migrate out of the slots between the plates and become pinched.

Slide sensors are located by the sidewalls of the slot or channel and the end of the channel just beyond the ejector pin. The slide sensors normally come in two standard configurations, the difference being the distance between the end of the slide sensor and the center line of the sensing element atop the sensor. The first standard with the distance larger by one-eighth inches was developed by applicant to provide greater protection to the sensor during insertion. However, molds provided with the more recent shorter standard can not use the longer sensors thus preventing interchangeability in the field.

SUMMARY OF THE INVENTION

The invention comprises a sensor body substantially rectangular in side view and generally peanut shaped in plan view with a relatively narrow waist between forward and rearward lobes. The sensor body contains electrical or mechanical sensing components actuateable by an ejector rod or pin resting on the upper surface of the sensor body at a specific distance from the forward end of the sensor body.

The double lobed sensor body can be slid into and out of a blind channel curved in the plane of the double lobe shape without disassembly of the ejector plate from the mold assembly. The radius of curvature of the channel need only be greater than the radius of curvature of the waist or neck between the lobes of the sensor body.

The sensor body is preferably attached to a ductile steel tube enclosing the cables to the sensing components in the sensor body. The tube is pre-curved to the radius of the blind channel and cut to proper length to retain the sensor properly seated at the blind end of the channel.

The sensor body can also be used as a button sensor by placement in an oblong slot in the mold assembly. The additional lobe provides added mass to the standard button transducer. The double lobed sensor body is therefore more rugged in use and less likely to move as the mold parts are assembled.

The sensor body preferably includes a tongue or appendage extending from the forward lobe or opposite end from the tube attachment. The tongue extends the one-eighth inches difference between the two slide transducer standard tip lengths for setting the centerline of the load cell or transducer the proper distance from the end of the slot. For the shorter standard, the tongue is ground or machined off by the customer to the sensor body contour beneath the tongue.

In another embodiment the sensor body is at the end of a multiple lobed flexible chain having snap-together elements and the cable passing through the snap-together elements. The elements provide a positive means to retain the sensor body in position at the end of the channel and a protective cover for the flexible cable passing therethrough.

DESCRIPTION OF THE DRAWINGS

FIG. 1 is a partial cross-section of a mold ejector plate with the new sensor inserted in a curved channel;

FIG. 2 is a plan view of the new mold pressure sensor body;

FIG. 3 is a side view of the mold pressure sensor body inserted in a mold ejector plate and taken along the line 3—3 in FIG. 1;

FIG. 4 is a side view of the mold pressure sensor body with the tip removed for insertion in a shorter sensor channel;

DESCRIPTION OF THE PREFERRED EMBODIMENTS

Figure 5:
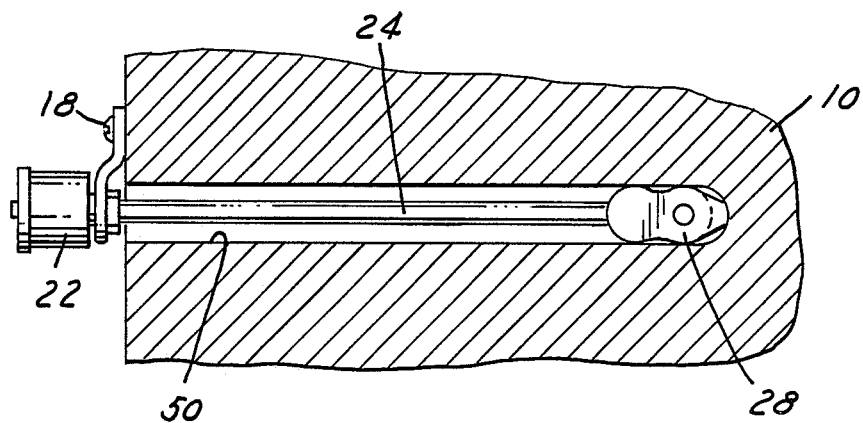
FIG. 5 is a partial cross-section of a mold ejector plate with the new sensor inserted in a straight channel.

Illustrated in FIG. 1 is a portion of a mold ejector plate 10 having a plurality of passageways for support pillars and other purposes 12. Formed in the mold ejector plate 10 is a curved channel 14 opening at 16 to the exterior of the mold assembly. Affixed by a bolt 18 and bracket 20 to the mold assembly, is an outside electrical junction box 22. A ductile steel extension tube 24 extends from the underside of the junction box 22 along the channel 14. A compression fitting 26 attaches the tube 24 and junction box 22 to the bracket 20.

In FIGS. 1 and 3 the mold pressure sensor 28 is shown fully inserted in the channel 14 with the tube 24 terminating in one end of the sensor. The tube 24 is permanently attached to the sensor in any conventional manner such as welding, brazing, adhesive or threaded fastening. Within the tube are the electrical cables (not shown) joining the junction box 22 to the sensor 28. The use of a steel tube that can be bent with standard tube bending equipment to conform with the arc of the curved channel 14 provides a solid steel protective sheath for the sensor cables.

As shown in FIGS. 1 and 2 the sensor body is generally peanut shaped in plan with a forward lobe 30 and rearward lobe 32 joined by a neck 34. The forward lobe 30 includes a sensing element 36 adapted to engage an ejector pin (not shown) extending through the hole 38 in the mold part 40. The sensor body includes a tongue 42 extending from the upper portion of the forward lobe 30. In practice the centerline 44 of the ejector pin hole 38 and ejector pin is located either 0.250 inches or 0.375 inches from the end 46 of the channel 14. The end of the tongue 42 extends 0.375 inches from the centerline 44 of the sensing element 36. Beneath the tongue 42, the end 48 of the sensor body is 0.250 inches from the centerline 44 of the sensing element 36. Thus, in FIG. 3 the tongue 42 engages the end 46 of the channel 14 to accurately place the sensing element 36 centerline coincident with the ejector pin centerline 44.

In FIG. 4 the modified sensor body 28 is shown with the tongue removed and the end 48' of the sensor body in engagement with the end 46' which is 0.250 inches from the centerline 44' of the ejector pin 38' and ejector pin. Thus, the sensing element 36' centerline is aligned with the ejector pin centerline 44'. The sensor body may suitably be constructed of steel and the tongue 42 removed by simply grinding off to the contour at 48 as shown in FIG. 2. Thus, the sensor body is suitable for use with either standard for locating the sensing element beneath the ejector pin.

The electrical junction box 22 in combination with the tube 24 retains the sensor body 28 against the end of the slot. With the junction box 22 assembly the electrical cables can be left longer than necessary for the initial installation. If needed the sensor can be withdrawn and longer or shorter tubing substituted. Cable splicing can be eliminated. The junction box 22 can enclose an integral amplifier thereby removing the amplifier from exposure to the temperatures and temperature changes at the sensor.

Figure 6:
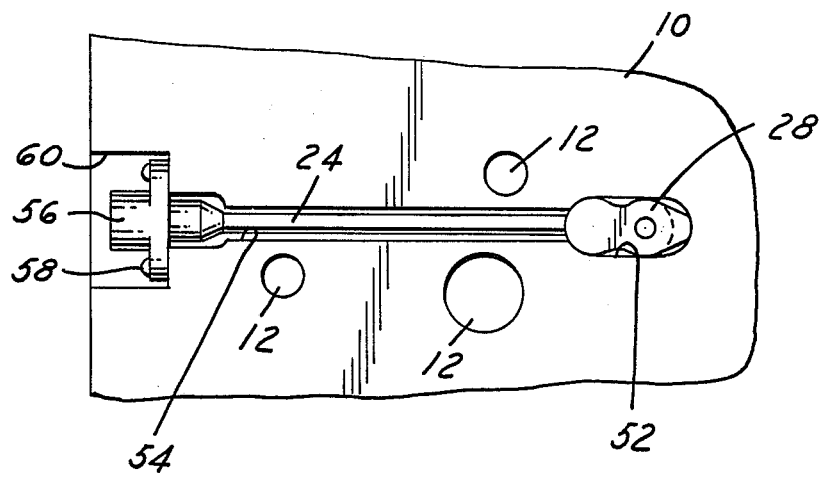
FIG. 6 is a partial plan view of a mold ejector plate section with the new sensor inserted in a button channel.

In FIGS. 5 and 6 the new double lobed sensor 28 is shown adapted to straight channel 50 and button mold or slot 52 configurations respectively. In FIG. 5 the sensor 28 can be readily removed by unfastening the bolt 18 and sliding out the steel tube 24 and sensor as in FIG. 1. The steel tube 24 better protects the cable (not shown) from the sensor 28 to the junction box 22.

In FIG. 6 the sensor 28 is inserted in an oblong milled slot 52 before assembly of the ejector plate 10 to the mold. The sensor 28 cannot be removed from the ejector plate 10 after assembly because of the narrowness of the access slot 54 that extends to the connector 56. The connector 56 is affixed with bolts 58 in a counterbored chamber 60 adjacent the outside of the ejector plate 10. Other mold requirements such as support pillars 12 require the narrow access slot 54 for the steel tube 24. Thus, the new sensor 28 body can be used in current button or straight channel configurations but also allows use in curved channels with retention of the ability to slide in and out of the channel without disassembly of the ejector plate from the mold.

Figure 7:
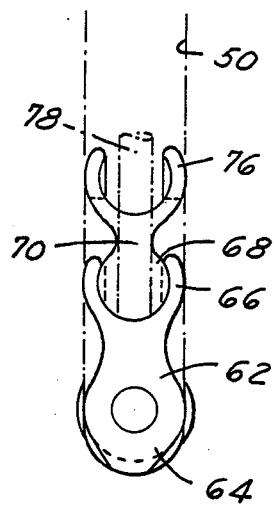
FIG. 7 is a partial plan view of a mold ejector plate section with the alternate flexible chain and sensor body elements inserted in a straight channel.
Figure 8:
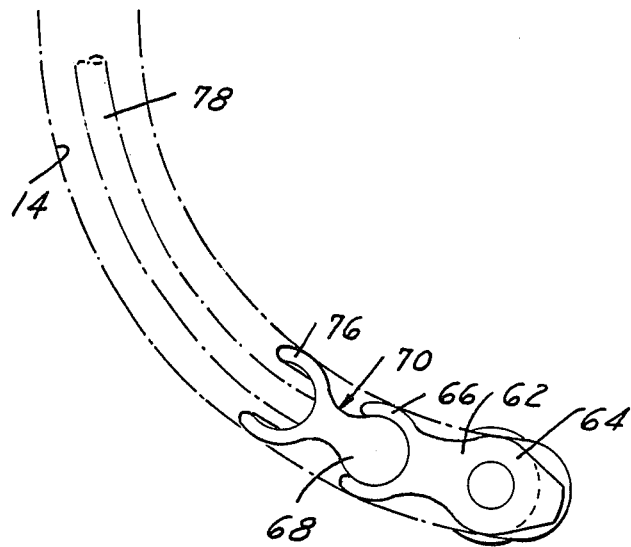
FIG. 8 is a partial plan view of a mold ejector plate section with the alternate flexible chain and sensor body elements inserted in a curved channel.
Figure 9A:
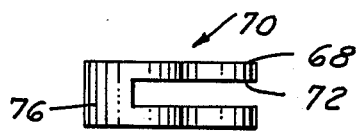
FIGS. 9a and 9b illustrate side and plan views of the individual chain elements.
Figure 9B:
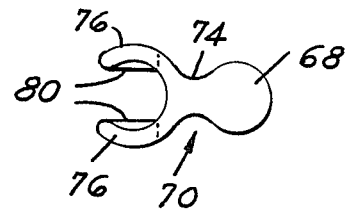

In FIGS. 7, 8 and 9 a modified sensor body 62 comprises a forward lobe 64 containing the sensor and shaped substantially the same as disclosed above and a rearward lobe 66 modified to accept the forward lobe 68 of a chain element 70. The chain elements are bifurcated 72 through the forward lobe 68 and waist 74 as shown best in FIG. 9 but solid vertically toward the maximum width and tips of the rearward open ended lobe 76.

With the solid tips of the rearward lobes 76 snapped about the bifurcated forward lobes 68 of the elements in sequence a passage way is formed for the electrical cable 78 joining a junction box on the mold exterior to the sensor in the sensor body 62. With this embodiment a shielded flexible cable or a plastic covered cable can be used with the elements 70 providing additional protection for the cable 78.

Within the channels 14 or 50 the elements are retained vertically by the channels. Outside of the channels the cable 78 retains the elements in substantially vertical alignment. However, as an option small tabs 80 centered inwardly of the rearward lobe 76 tips may be provided to engage the forward lobe 68 bifurcation 72 on each side of the element 70. With snap-together engagement vertical alignment of the elements 70 is assured. The elements 70 may be formed of metal or a variety of plastic materials.

I claim:

1. A mold pressure sensor body comprising in plan view two smoothly curving lobes joined by a narrowed neck portion therebetween connecting the lobes together, and means extending from one of the lobes to insert and withdraw the body through a channel in a mold assembly.

2. A mold pressure sensor body comprising in plan view two lobes joined by a narrowed neck portion therebetween connecting the lobes together, and means extending from one of the lobes to insert and withdraw the body through a channel in a mold assembly wherein the sensor body is substantially rectangular in side view, the bottom of said sensor body forming a sliding surface for the body.

3. The sensor body of claim 1 including a tongue extending from the other lobe in the opposite direction from the insertion and withdrawal means.

4. The sensor body of claim 3 wherein the thickness of the tongue is less than the thickness of the adjacent other lobe.

5. The sensor body of claim 4 wherein the distance the tongue extends from the other lobe defines the difference in sensor body tip length between two sensor body standard tip lengths.

6. The sensor body of claim 3 wherein the distance the tongue extends from the other lobe defines the difference ins ensor body tip length between two sensor body standard tip lengths.

7. A mold pressure sensor body comprising in plan view two lobes joined by a narrowed neck portion therebetween connecting the lobes together, and means extending from one of the lobes to insert and withdraw the body through a channel in a mold assembly, the insertion and withdrawal means comprising a ductile hollow tube formable to the curvature of a channel in a mold assembly.

8. The sensor body of claim 7 wherein the ductile hollow tube encloses cables to a sensing device in the sensor body.

9. In a mold assembly having a cavity therein for forming a product, an ejector plate, ejector pins communicating between the cavity and the ejector plate, and a sensor inserted between the ejector plate and an ejector pin, the improvement comprising a double lobed sensor body enclosing the sensor, said lobes integrally joined by a narrowed neck portion.

10. The mold assembly of claim 9 including a slot formed in the mold, said double lobe sensor body located in the slot.

11. The mold assembly of claim 10 wherein the slot extends to the exterior of the mold and a tube extends through the slot and engages the rearward lobe of the double lobe sensor body.

12. The mold assembly of claim 11 wherein the slot terminates with an end just beyond the ejector pin and the forward lobe of the double lobe sensor body is retained against the slot end.

13. The mold assembly of claim 11 wherein the forward lobe of the double lobe sensor body includes a tongue extending therefrom, said tongue engaging the slot end.

14. The mold assembly of claim 11 wherein the slot is curved, said curve having a radius greater than the radius of the narrowed neck between the double lobes of the sensor body.

15. A mold pressure sensor body comprising in plan view two lobes joined integrally by a narrowed neck portion therebetween connecting the lobes together and pressure sensing means generally centered in the upper surface of one of the lobes.

16. The mold pressure sensing body of claim 15 including means extending from the other lobe to insert and withdraw the body through a slot in a mold assembly.

17. The mold pressure sensor body of claim 15 wherein the means extending from the other lobe comprise a ductile tube to enclose cables to the pressure sensing means in the sensor body.

18. The mold pressure sensor body of claim 15 including a tongue extending from the pressure sensing lobe of the sensor body.

19. The mold pressure sensor body of claim 18 wherein the tongue thickness is less than the thickness of the pressure sensing lobe.

20. The mold pressure sensor body of claim 18 wherein the distance the tongue extends defines the difference in sensor body tip length between two sensor body standard tip lengths.

21. A mold pressure sensor assembly comprising a mold pressure sensor body and a plurality of sequentially engaged elements terminating at one end in engagement with the sensor body,
the sensor body comprising in plan view two lobes joined by a narrowed neck portion therebetween connecting the lobes together, and
at least one element comprising in plan view two lobes joined by a narrowed neck portion therebetween connecting the lobes together, said element bifurcated in side view through one lobe and the narrrowed neck portion to provide a continuous passageway element to element through the assembly to the sensor.

22. The mold pressure sensor assembly of claim 21 wherein one lobe of said element is hollow and open-ended in plan view with tips of the lobe on either side extended partially about the hollow to form the open end and the other lobe is sized in plan view to engage the hollow open-ended lobe of the element next in sequence.

23. The mold pressure sensor assembly of claim 21 including a cable extending element to element through said passageway.

24. The mold pressure sensor assembly of claim 21 including mutually engageable means on said elements to align said elements vertically.

* * * * *